United States Patent
Cox

(10) Patent No.: US 9,880,188 B2
(45) Date of Patent: Jan. 30, 2018

(54) SPEED SENSOR AUTHORITY FOR AND METHOD OF MEASURING SPEED OF ROTATION

(75) Inventor: Calvin Howard Cox, Mirfield (GB)

(73) Assignee: CUMMINS TURBO TECHNOLOGIES LIMITED, Huddersfield (GB)

(*) Notice: Subject to any disclaimer, the term of this patent is extended or adjusted under 35 U.S.C. 154(b) by 979 days.

(21) Appl. No.: 13/407,266

(22) Filed: Feb. 28, 2012

(65) Prior Publication Data

US 2012/0299583 A1    Nov. 29, 2012

Related U.S. Application Data

(63) Continuation of application No. PCT/GB2010/001552, filed on Aug. 18, 2010.

(30) Foreign Application Priority Data

Aug. 28, 2009 (GB) .................................. 0915038.4

(51) Int. Cl.
*G01P 3/44* (2006.01)
*G01P 3/48* (2006.01)
(Continued)

(52) U.S. Cl.
CPC ............. *G01P 3/48* (2013.01); *F01D 17/06* (2013.01); *F02B 39/00* (2013.01); *G01B 7/30* (2013.01);
(Continued)

(58) Field of Classification Search
CPC ........ G01D 5/24; G01D 5/2405; G01D 5/241; G01D 5/2412; G01D 5/2415;
(Continued)

(56) References Cited

U.S. PATENT DOCUMENTS 4,329,644 A * 5/1982 Libertini et al. ............. 324/160
4,370,614 A   1/1983 Kawada et al.
(Continued)

FOREIGN PATENT DOCUMENTS

DE   102004039739 A1   2/2006
DE   102007005769 A1   8/2008
(Continued)

OTHER PUBLICATIONS

United Kingdom Search Report GB0915038.4, Cummins Turbo Technologies Limited, dated Oct. 8, 2009, UK Intellectual Office Property.
(Continued)

*Primary Examiner* — David M. Schindler
(74) *Attorney, Agent, or Firm* — Taft Stettinius & Hollister LLP

(57) ABSTRACT

Sensor arrangement for measuring a rotation speed of a salient member of a rotatable body comprising a first electrode arrangement providing a first input, a second electrode arrangement providing a second input different from the first input, the first and second electrode arrangements configured so noise in the first and second inputs is substantially the same, and wherein variations in the first and second inputs are caused by rotation of the rotatable body and the salient member past the first and second electrode arrangements, an output arrangement for receiving the first and second inputs, and for providing an output proportional to a difference between the first and second inputs, and a retaining member for retaining one or more of the first and second electrode arrangements and output arrangement, the speed of rotation of the salient member measurable from a variation in the output caused by rotation of that salient member.

8 Claims, 6 Drawing Sheets

Figure 1:
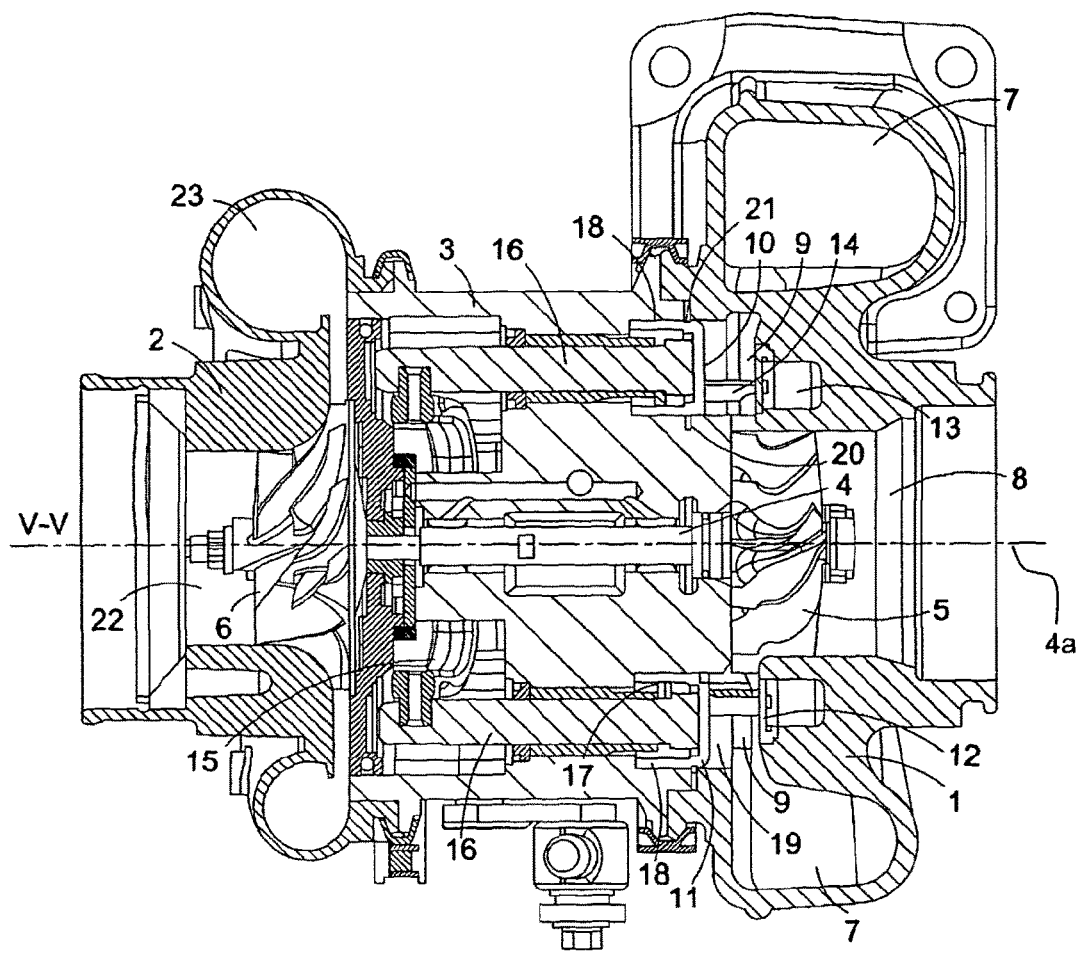

(51) Int. Cl.
*G01B 7/30* (2006.01)
*F01D 17/06* (2006.01)
*F02B 39/00* (2006.01)
*G01P 3/481* (2006.01)
*G01P 3/483* (2006.01)

(52) U.S. Cl.
CPC .............. *G01P 3/481* (2013.01); *G01P 3/483* (2013.01); *F05D 2220/40* (2013.01); *F05D 2270/304* (2013.01)

(58) Field of Classification Search
CPC ........ G01D 5/2417; G01D 5/242; G10P 3/44; G10P 3/48; G10P 3/481; G10P 3/483; H02K 11/0015; G01B 7/14; G01B 7/30; F01D 17/06; F05D 2270/304; F05D 2220/40
See application file for complete search history.

(56) References Cited

U.S. PATENT DOCUMENTS

| | | | | |
|---|---|---|---|---|
| 4,823,071 | A * | 4/1989 | Ding et al. | 324/662 |
| 5,402,680 | A * | 4/1995 | Korenaga | G01P 5/07 324/161 |
| 5,754,042 | A * | 5/1998 | Schroeder | G01B 7/30 324/207.21 |
| 5,973,502 | A * | 10/1999 | Bailleul et al. | 324/690 |
| 6,140,813 | A | 10/2000 | Sakanoue et al. | |
| 2007/0128016 | A1* | 6/2007 | Dasgupta et al. | 415/14 |

FOREIGN PATENT DOCUMENTS

| | | |
|---|---|---|
| EP | 0310236 A2 | 4/1989 |
| GB | GB 2143037 A | 1/1985 |
| GB | GB 2416848 A | 2/2006 |
| GB | GB 2448940 A | 11/2008 |
| GB | GB 2455800 A | 6/2009 |
| WO | WO 00/46581 A1 | 8/2000 |
| WO | WO 2008/081196 | 7/2008 |
| WO | WO 2008139199 A2 * | 11/2008 |

OTHER PUBLICATIONS

International Search Report PCT/GB2010/001552, Cummins Turbo Technologies Limited, dated Nov. 30, 2010, Searching Authority/ European Patent Office International.

Written Opinion PCT/GB2010/001552, Cummins Turbo Technologies Limited, dated Nov. 30, 2010, International Searching Authority/European Patent Office.

* cited by examiner

SPEED SENSOR AUTHORITY FOR AND METHOD OF MEASURING SPEED OF ROTATION

RELATED APPLICATIONS

The present application is a continuation of PCT/GB2010/001552 filed Aug. 18, 2010, which claims priority to United Kingdom Patent Application No. 0915038.4 filed Aug. 28, 2009, each of which is incorporated herein by reference.

The present invention relates to a speed sensor arrangement. Particularly, but not exclusively, the present invention relates to a speed sensor arrangement for measuring the speed of rotation of a compressor wheel or turbine wheel of a turbomachine, such as, for example, a turbocharger.

Turbochargers are well known devices for supplying air to the intake of an internal combustion engine at pressures above atmospheric (boost) pressure. A conventional turbocharger typically comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the intake manifold of the engine, thereby increasing engine power.

It is known to provide a turbocharger with a sensor arrangement to measure operating characteristics of the turbocharger, for example a speed of rotation of a turbine wheel of the turbocharger. Any such operating characteristics can be used as one parameter of a turbocharger control system, which may be in addition to or form part of an engine control system. The characteristic, for example the speed of rotation of a turbine wheel of the turbocharger, may be used to monitor, prevent or counteract any turbocharger over speeding or the like.

One type of speed sensor arrangement that is known comprises an electrode that is located in the vicinity of a turbine wheel, the speed of rotation of which is to be determined. The electrode may be mounted, for example, in a bore provided in the wall of the turbine housing which houses the turbine wheel. As the turbine wheel rotates, the electrode is able to detect perturbations as each blade of the turbine wheel sweeps past the electrode. The perturbations may be, for example, perturbations in capacitance, or perturbations in charge accumulated at the electrode, or perturbations in an electric field, for example, between the electrode and the turbine wheel, or the like.

Within and around a turbine housing, there may be a significant amount of noise. The noise may be generated by rotation of the turbine wheel itself, movement of one or more other parts of the turbocharger, or noise caused by, for example, the presence of electric fields in the vicinity of the electrode (e.g. due to a build up of static electricity), or electric currents flowing through the turbine housing or surrounding structures (e.g. a vehicle chassis). This noise reduces the signal-to-noise ratio at the electrode, which can make it difficult or impossible to accurately and/or consistently determine the nature (e.g. frequency or magnitude) of any perturbations. Consequently, the noise may make it difficult or impossible to actually and/or consistently determine the speed of rotation of the blade of the turbine wheel (or in general, a salient member of any rotatable body for which the speed sensor arrangement is used to measure the speed of rotation).

It is an object of the present invention to provide a speed sensor arrangement for measuring the speed of rotation of a salient member of a rotatable body (e.g. a blade of a turbine wheel or compressor wheel) which obviates or mitigates a problem of the prior art, whether identified herein or elsewhere, or provides an alternative to prior art speed sensor arrangements.

According to a first aspect of the present invention, there is provided a speed sensor arrangement for use in measuring a speed of rotation of a salient member of a rotatable body, the speed sensor arrangement comprising: a first electrode arrangement configured to provide a first input; a second electrode arrangement configured to provide a second input, the second input being different from the first input, the first electrode arrangement and second electrode arrangement being configured such that first noise in the first input is substantially the same as first noise in the second input (e.g. so that the first noise is common mode noise), and wherein a variation in the first input and a variation in the second input is caused, in use, by rotation of the rotatable body and associated movement of the salient member past the first electrode arrangement and the second electrode arrangement; an output arrangement, the output arrangement being configured to receive the first input and the second input, and to provide an output that is proportional to a difference between the first input and the second input; and a retaining member, one or more of the first electrode arrangement, second electrode arrangement and output arrangement being retainable by the retaining member, the speed of rotation of the salient member being measurable from a variation in the output caused by rotation of that salient member.

The retaining member may be arranged to extend at least partially around an axis of rotation of the rotatable body. The retaining member may have a shape that is substantially that of a cylindrical shell. The retaining member may be moveable into and out of a position that is proximate to the rotatable body.

The first electrode arrangement may have a different configuration to that of the second electrode arrangement, the difference in configuration being at least one of: a difference in position, and/or material, and/or shape and/or size between the first electrode arrangement and the second electrode arrangement, to cause a difference in phase, and/or magnitude, and/or polarity between the first input and the second input.

The first electrode arrangement may comprise of a first electrode in connection with a first body of material; and the second electrode arrangement may comprise a second electrode in connection with a second body of material, the first body of material having a tendency to gain electrons, and the second body of material having a tendency to lose electrons.

At least one of the first electrode arrangement and the second electrode arrangement may be moveable, the retaining member being configured to accommodate movement of the at least one of the first electrode arrangement and the second electrode arrangement and to retain the at least one of the first electrode arrangement and the second electrode arrangement after such movement.

The arrangement may comprise three or more electrode arrangements, each of the three or more electrode arrangements being configured to provide a respective input, and any two or more of the three electrodes being connectable to or connected to the output arrangement in order to be able to select which two inputs are provided to the output arrangement. The arrangement may further comprise a selection arrangement that is arranged to select two desired inputs to provide to the output arrangement, or two inputs to provide to the output arrangement in order to provide a desired output.

The arrangement may comprise two or more pairs of electrode arrangements, each pair of electrode arrangements being configured to provide an input to an output arrangement associated with that pair, the arrangement further comprising a selection arrangement configured to receive an output from each of the output arrangements, and to select a desired output.

The output arrangement may be or comprise an amplifier or a differential amplifier.

The arrangement may further comprise a voltage source for supplying a constant voltage, and wherein one or both of the first electrode arrangement and the second electrode arrangement are connected to the voltage source.

The rotatable body may comprise a plurality of salient members.

The first electrode arrangement and/or second electrode arrangement may comprise of a plurality of electrodes. The plurality of electrodes may be connected in parallel.

The first electrode arrangement and/or second electrode arrangement may be formed using, or with, or in connection with, a laminar (i.e. layered) construction.

According to a second aspect of the present invention, there is provided a compressor or turbine comprising the speed sensor arrangement of the first aspect of the present invention.

The rotatable member may be a compressor wheel or a turbine wheel. The salient member may be a blade of a compressor wheel or of a turbine wheel.

The retaining member may be an insert for an inlet of the compressor, or be an outlet of the turbine.

The retaining member may be, or serves as, a compressor noise baffle, or as a turbine noise baffle.

The retaining member may be moveable into and out of a part of a compressor housing or of a turbine housing (e.g. an outlet or inlet, such as an axial outlet or inlet).

According to a third aspect of the present invention there is provided a turbocharger comprising the speed sensor arrangement of the first aspect of the present invention, or the compressor or turbine of the second aspect of the present invention.

According to a fourth aspect of the present invention method of measuring a speed of rotation of a salient member of a rotatable body using a speed sensor, the method comprising: a rotation of the rotatable body; providing a first input using a first electrode arrangement; providing a second input using a second electrode arrangement, the second input being different from the first input, the first electrode arrangement and second electrode arrangement being configured such that first noise in the first input is substantially the same as first noise in the second input (e.g. so that the noise is common mode noise), a variation in the first input and a variation in the second input being caused by the rotation of the rotatable body and associated movement of the salient member past the first electrode arrangement and the second electrode arrangement; providing an output using an output arrangement, the output arrangement being configured to receive the first input and the second input, and to provide the output, the output being proportional to a difference between the first input and the second input; one or more of the first electrode arrangement, second electrode arrangement and output arrangement being retained during the method; and measuring the speed or rotation of the salient member using the variation in the output caused by rotation of that salient member.

The first noise which is common to both the first input and second input may be common mode noise. The first electrode and second electrode may be similarly susceptible to or sensitive to at least one common mode noise source, and/or to common mode interference. Other (e.g. second or third noise) may be present in the inputs. If the noise is common to both inputs, the output from the output arrangement will not contain this noise, since the output is proportional to a difference in the inputs. Only one of the inputs may be subjected to additional noise (e.g. noise other than the first noise), and this may thus form part of the output. However it is likely that since such noise will only affect one input, such noise will not be as significant as common mode (i.e. first noise), and that the output will be not be significantly affected.

Other advantageous and preferred features of the invention will be apparent from the following description.

Figure 2:
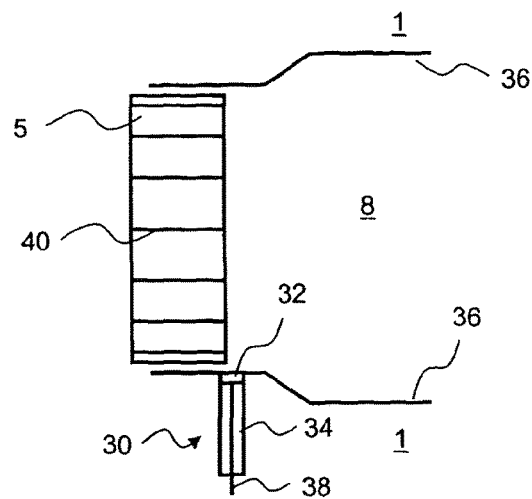
Figure 3A:
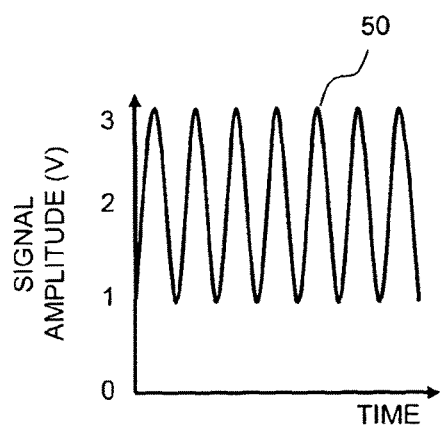
Figure 3B:
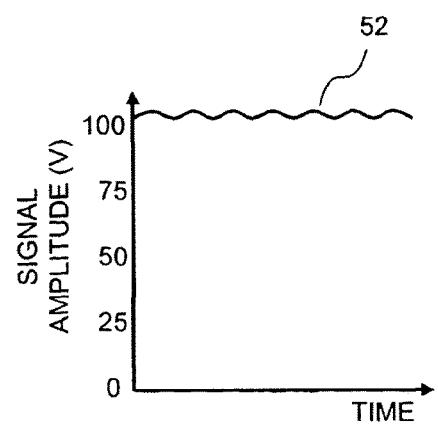
Figure 4:
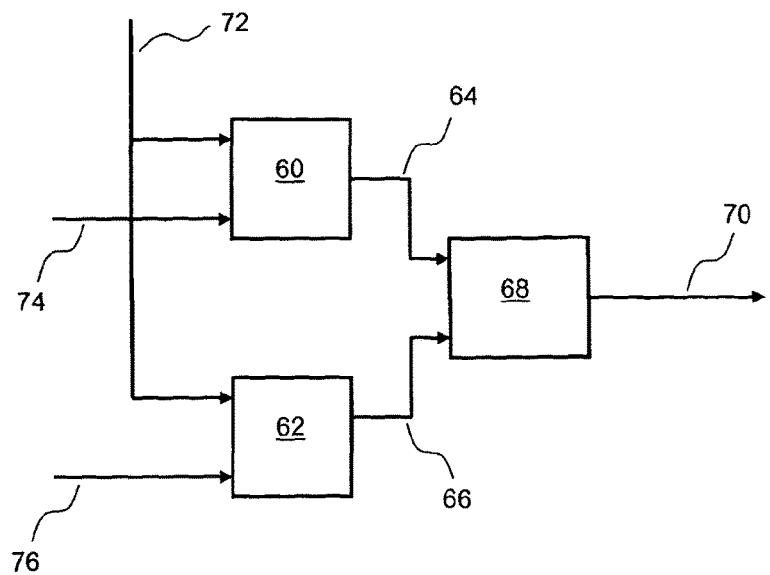
Figure 5:
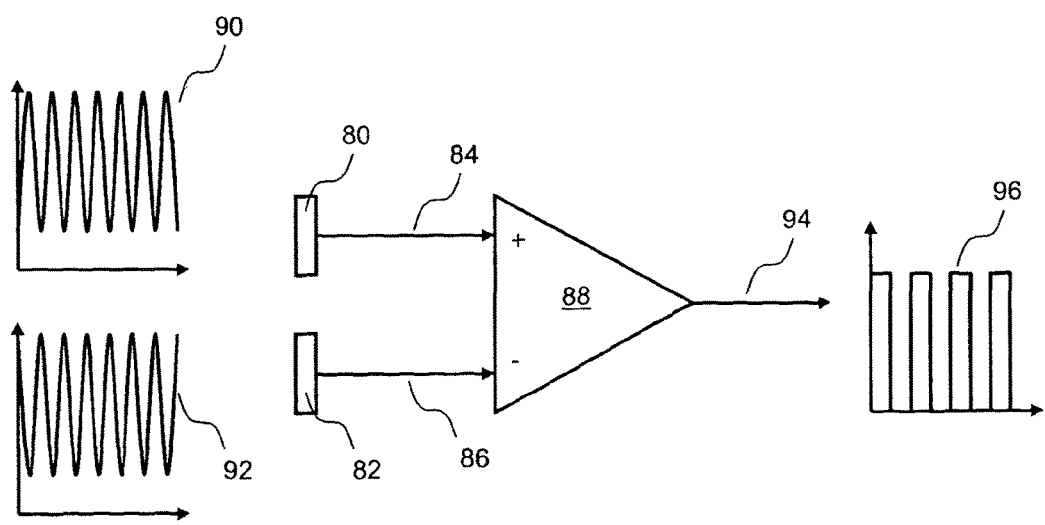
Figure 6:
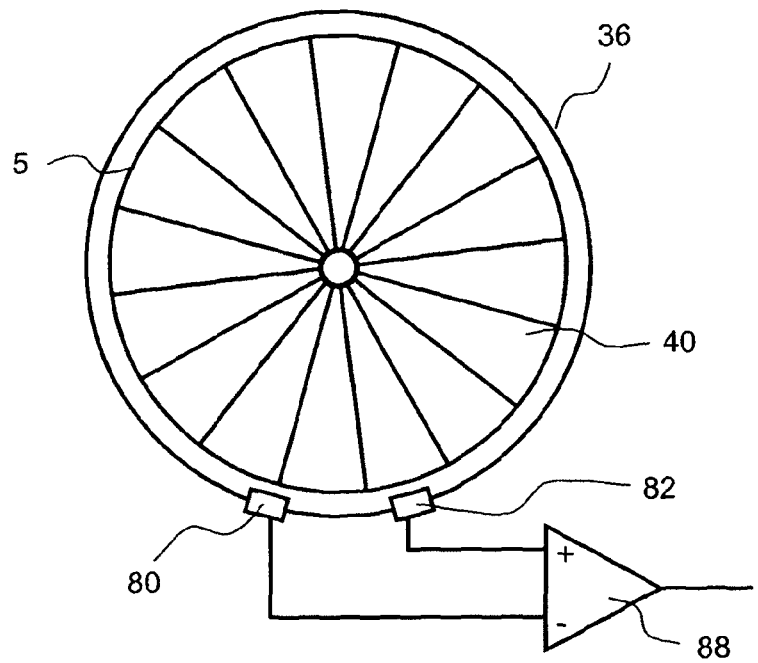
Figure 7:
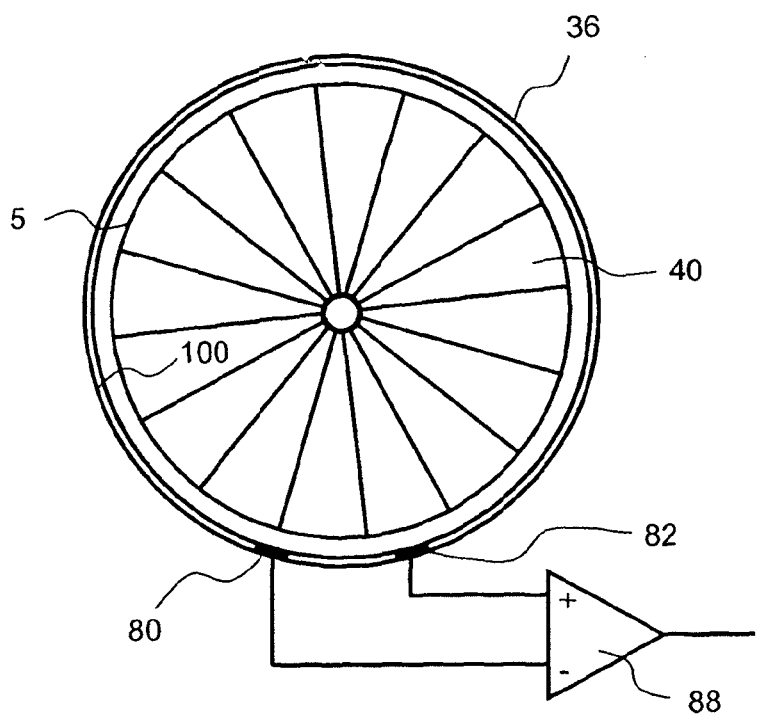
Figure 8:
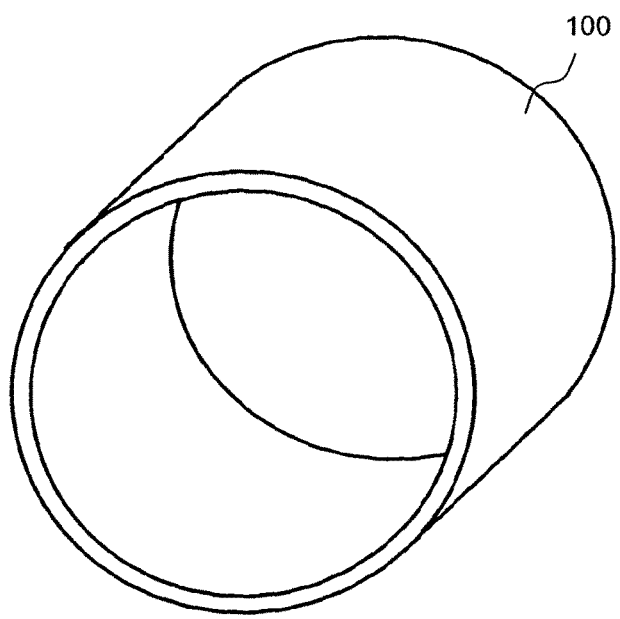
Figure 9:
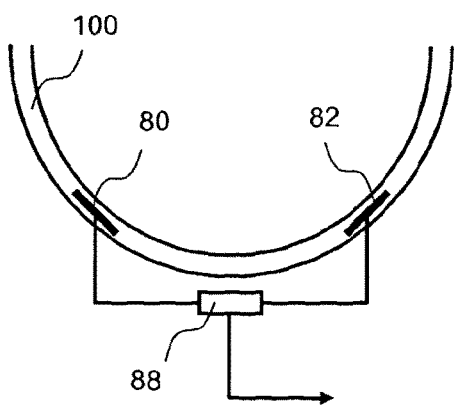
Figure 10:
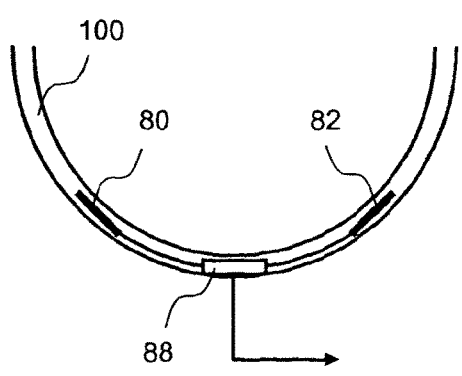
Figure 11:
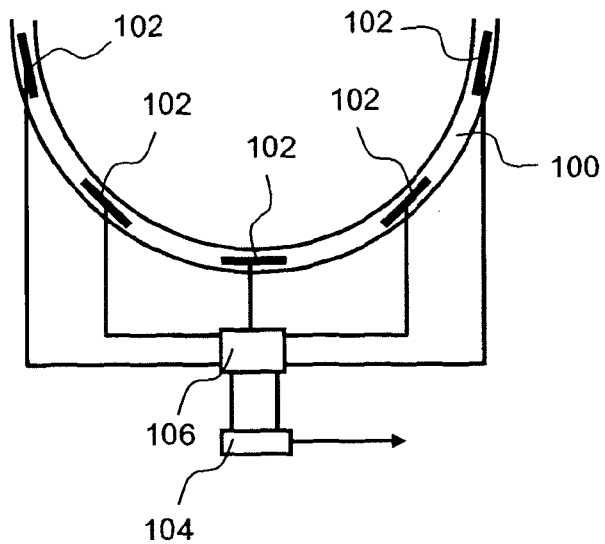
Figure 12:
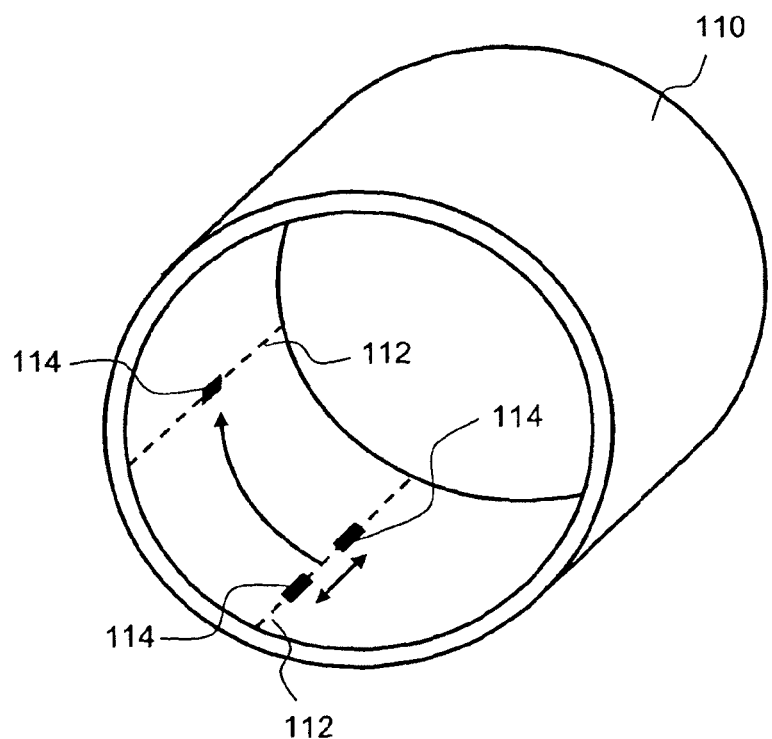

Specific embodiments of the present invention will now be described, by way of example only, with reference to the accompanying Figures, in which:

FIG. 1 schematically depicts an axial cross-section through a variable geometry turbocharger;

FIG. 2 schematically depicts a simplified view of part of the variable geometry turbocharger of FIG. 1, together with a known speed sensor arrangement;

FIGS. 3a and 3b are graphs schematically depicting a first input and a second input, respectively, provided by the speed sensor arrangement of FIG. 2;

FIG. 4 schematically depicts principles of a speed sensor arrangement according to an embodiment of the present invention;

FIG. 5 schematically depicts a more detailed representation of a speed sensor arrangement according to an embodiment of the present invention;

FIG. 6 schematically depicts a speed sensor arrangement according to an embodiment of the present invention in relation to a turbine wheel of a turbocharger;

FIG. 7 schematically depicts a speed sensor arrangement according to another embodiment of the present invention in relation to a turbine wheel of a turbocharger;

FIG. 8 schematically depicts a retaining member for retaining one or more of the first electrode arrangement, second electrode arrangement and output arrangement of a speed sensor arrangement according to an embodiment of the present invention;

FIG. 9 schematically depicts the retaining member of FIG. 8 retaining certain components of the speed sensor arrangement according to an embodiment of the present invention;

FIG. 10 schematically depicts the retaining member of FIG. 8 retaining certain components of the speed sensor arrangement according to another embodiment of the present invention;

FIG. 11 schematically depicts a speed sensor arrangement according to another embodiment of the present invention; and FIG. 12 schematically depicts principles associated with a speed sensor arrangement according to a further embodiment of the present invention.

FIG. 1 illustrates a variable geometry turbocharger comprising a variable geometry turbine housing 1 and a compressor housing 2 interconnected by a central bearing housing 3. A turbocharger shaft 4 extends from the turbine housing 1 to the compressor housing 2 through the bearing housing 3. A turbine wheel 5 is mounted on one end of the shaft 4 for rotation within the turbine housing 1, and a compressor wheel 6 is mounted on the other end of the shaft 4 for rotation within the compressor housing 2. The shaft 4 rotates about turbocharger axis 4a on bearing assemblies located in the bearing housing 3.

The turbine housing 1 defines an inlet volute 7 to which gas from an internal combustion engine (not shown) is delivered. The exhaust gas flows from the inlet chamber 7 to an axial outlet passageway 8 via an annular inlet passageway 9 and turbine wheel 5. The inlet passageway 9 is defined on one side by the face 10 of a radial wall of a movable annular wall member 11, commonly referred to as a "nozzle ring", and on the opposite side by an annular shroud 12 which forms the wall of the inlet passageway 9 facing the nozzle ring 11. The shroud 12 covers the opening of an annular recess 13 in the turbine housing 1.

The nozzle ring 11 supports an array of circumferentially and equally spaced inlet vanes 14 each of which extends across the inlet passageway 9. The vanes 14 are orientated to deflect gas flowing through the inlet passageway 9 towards the direction of rotation of the turbine wheel 5. When the nozzle ring 11 is proximate to the annular shroud 12, the vanes 14 project through suitably configured slots in the shroud 12, into the recess 13. In another embodiment (not shown), the wall of the inlet passageway may be provided with the vanes, and the nozzle ring provided with the recess and shroud.

The position of the nozzle ring 11 is controlled by an actuator assembly, for example an actuator assembly of the type disclosed in U.S. Pat. No. 5,868,552. An actuator (not shown) is operable to adjust the position of the nozzle ring 11 via an actuator output shaft (not shown), which is linked to a yoke 15. The yoke 15 in turn engages axially extending moveable rods 16 that support the nozzle ring 11. Accordingly, by appropriate control of the actuator (which may for instance be pneumatic or electric), the axial position of the rods 16 and thus of the nozzle ring 11 can be controlled.

The nozzle ring 11 has axially extending radially inner and outer annular flanges 17 and 18 that extend into an annular cavity 19 provided in the turbine housing 1. Inner and outer sealing rings 20 and 21 are provided to seal the nozzle ring 11 with respect to inner and outer annular surfaces of the annular cavity 19 respectively, whilst allowing the nozzle ring 11 to slide within the annular cavity 19. The inner sealing ring 20 is supported within an annular groove formed in the radially inner annular surface of the cavity 19 and bears against the inner annular flange 17 of the nozzle ring 11. The outer sealing ring 20 is supported within an annular groove formed in the radially outer annular surface of the cavity 19 and bears against the outer annular flange 18 of the nozzle ring 11.

Gas flowing from the inlet chamber 7 to the outlet passageway 8 passes over the turbine wheel 5 and as a result torque is applied to the shaft 4 to drive the compressor wheel 6. Rotation of the compressor wheel 6 within the compressor housing 2 pressurises ambient air present in an air inlet 22 and delivers the pressurised air to an air outlet volute 23 from which it is fed to an internal combustion engine (not shown). The speed of the turbine wheel 5 is dependent upon the velocity of the gas passing through the annular inlet passageway 9. For a fixed rate of mass of gas flowing into the inlet passageway, the gas velocity is a function of the width of the inlet passageway 9, the width being adjustable by controlling the axial position of the nozzle ring 11. FIG. 1 shows the annular inlet passageway 9 fully open. The inlet passageway 9 may be closed to a minimum by moving the face 10 of the nozzle ring 11 towards the shroud 12.

It may be desirable to be able to measure the speed of rotation of a turbine wheel of a turbocharger, for example, the turbine wheel of the turbocharger of FIG. 1. FIG. 2 schematically depicts a part of the turbocharger of FIG. 1, together with a known speed sensor arrangement 30. A simplified view of the turbine wheel 5 is shown, together with the axial annular passageway 8 and a part of the turbine housing 1. The speed sensor arrangement 30 comprises an electrode 32 which extends through a bore 34 provided in the turbine housing 1. The electrode 32 is adjacent to, forms part of, or extends from an internal wall 36 of the turbine housing 1. The electrode 32 may be in electrical connection with further electrical components via an electrical wire 38 or the like.

Rotation of the turbine wheel 5 causes blades 40 of the turbine wheel 5 to sweep or be swept past the electrode 32. The electrode 32 detects perturbations as a consequence of the passing of the blades 40. These perturbations may be perturbations in capacitance, electric field, charge gained or lost by the electrode or the like.

FIG. 3a is a graph schematically depicting a first input 50 that may be provided by the electrode of FIG. 2 to, for example, further electronics. The signal amplitude of the first input 50 varies periodically as a function of time. The periodicity may, for example, correspond to the timing of the passage of blades of a turbine wheel past the electrode, and thus the speed of rotation of the turbine wheel can be calculated from this periodicity. The signal amplitude may vary, for example, from 1V to 3V.

FIG. 3b schematically depicts a graph which shows an example of a second, different input 52 provided by the electrode of the speed sensor arrangement of FIG. 2 (e.g. at a different time). The signal amplitude of the second input 52 varies periodically over time. The periodicity is substantially the same as that of the first input of FIG. 3a. However, in FIG. 3b, the signal amplitude of the second input 52 does not vary between 1V and 3V, but instead varies between 101V and 103V due to a background noise level of 100V. This background level may be present as a consequence of, for example, noise in the environment in which the electrode that provides the second signal 52 is located.

In some embodiments, the background noise level may not affect the calculation of the periodicity of the second input 52 and thus the calculation of the speed rotation of the turbine wheel. However, in other embodiments, the background noise level may make it more difficult or even impossible to be able to determine the speed of rotation of a turbine wheel from the second input 52. For instance, the presence of a background noise level may mean that the signal amplitude never falls below a certain threshold value, which threshold value may be used to trigger a frequency counter or the like that is used to determine the periodicity of the second input 52. Alternatively or additionally, it may be impossible to determine a small periodically varying signal on a much larger background noise level, especially if that background level is also varying over time. For instance, the noise may not be a constant background level, but can, as is commonly the case, vary randomly in frequency and/or magnitude, making it even more difficult to able to accurately and/or consistently determine the periodicity of the second input 52.

It is desirable to be able to remove a substantial amount, a majority of, or all noise from the input signal provided by the electrode to obviate or mitigate the problems associated with the presence of noise in the input signal.

One or more problems associated with the prior art, whether identified herein or elsewhere, can be obviated or mitigated using a speed sensor arrangement for use in measuring a speed of rotation of a salient of a rotatable body, in accordance with an embodiment of the present invention. In accordance with an embodiment of a present invention, the speed sensor arrangement comprises a first electrode arrangement configured to provide a first input (to, for example, further electronics or the like). A second electrode arrangement is also provided, and which is configured to provide a second input (to, for example, further electronics or the like). The second input is different from the first input. The first input can be made to be different from the second input by ensuring that the first electrode arrangement has a different overall configuration to that of the second electrode arrangement. The difference in the configuration of the electrode arrangements may be, for example, at least one of: a difference in position between the first electrode arrangement and the second electrode arrangement, to cause a difference in phase (for example) between the first input and the second input; and/or a difference in material, shape or size between the first electrode arrangement and the second electrode arrangement, to cause a difference in magnitude and/or polarity between the first input and the second input.

The first electrode arrangement and second electrode arrangement are configured such that a first noise in the first input is substantially the same as a first noise in the second input (e.g. the first noise being common mode noise). This may be achieved, for example, by ensuring that the first electrode arrangement and second electrode arrangement are located in, for example, substantially the same environment. For instance, the first electrode arrangement and second electrode arrangement may be located in the same gas inlet or outlet of a turbocharger, or any other suitable environment.

The speed sensor arrangement further comprises an output arrangement. The output arrangement is configured to receive the first input and the second input, and to provide an output signal that is proportional to a difference between the first input and the second input. Because the output signal is proportional to a difference between the first input and the second input, any common noise (e.g. common mode noise) is rejected, thus obviating or mitigating the problems associated with the presence of noise in an input signal discussed above. The output arrangement can be any suitable arrangement, for example, an amplifier, or specifically a differential amplifier.

A variation in the first input and a variation in the second input is (or will be) caused, in use, by rotation of the rotatable body and associate movement of the salient member past the first electrode and the second electrode. The speed of rotation of a salient member is measurable from the variation (e.g. from the time varying nature or periodicity of the variation).

The speed sensor arrangement further comprises a retaining member. One or more of the first electrode arrangement, second electrode arrangement, and output arrangement are retainable by the retaining member. The retaining member may be, for example, an adhesive or the like, or a body of material in which, or on which, the first electrode arrangement, second electrode arrangement, and/or output arrangement may be located. The retaining member may be, for example, a bore or channel or the like, for instance in a body that houses the rotatable body (e.g. a turbine housing or compressor housing). The retention may be permanent, temporary, or selectable. The retention may be selectable in that one or more of the first electrode arrangement, second electrode arrangement, and output arrangement may be selectively retained by the retaining member, for example, in or at one or more retention points which may be, for example, grooves, catches, latches, slots or the like provided in the retaining member.

Specific embodiments of the present invention will now be described, by way of example only, with reference to FIGS. 4 to 12. The embodiments shown in these Figures are depicted schematically, and are not necessarily drawn to any particular scale.

FIG. 4 schematically depicts a representation of a speed sensor arrangement in accordance with an embodiment of the present invention. The speed sensor arrangement comprises a first electrode arrangement 60 and a second electrode arrangement 62. One or both of the first electrode arrangement 60 and second electrode arrangement 62 may be or may comprise one or more electrodes, or one or more electrodes in connection with one or more bodies of material. For instance, the one or more bodies of material may have a tendency to gain electrons, or a tendency to lose electrons (i.e. to be at different ends of the triboelectric series).

The first electrode arrangement 60 has a first configuration, and the second electrode arrangement 62 has a second, different configuration. The configurations are different in order to ensure that a first input 64 provided by the first electrode 60 is different from a second input 66 provided by the second electrode 62. The difference in configurations may be, as discussed above, a difference in position between the first electrode arrangement 60 and the second electrode arrangement 62, to, for example, cause a difference in phase between the first input 64 and the second input 66; and/or a difference in a material, shape or size between the first electrode arrangement 60 and second electrode arrangement 62, to cause a difference in magnitude and/or polarity between the first input 64 and the second input 66.

The first input 64 and second input 66 are arranged to be received by an output arrangement 68. The output arrangement 68 is arranged to provide an output signal 70 that is proportional to a difference between the first input 64 and the second input 66. A speed of rotation of a salient member (of a rotatable body) that passes by the first electrode arrangement and second electrode arrangement may be measured using, or determined from a variation in the output signal 70 caused by rotation of that salient member.

The first electrode arrangement 60 and second electrode arrangement 62 are arranged to be in an environment in which a noise level 72 (e.g. a first noise level) is substantially the same (i.e. the level and/or nature of the noise 72 provided to the electrode arrangements 60, 62 is substantially the same, such that the noise is common mode noise). Because the electrode arrangements 60, 62 have different configurations, an input to each of the electrode arrangements 60, 62 will be different. For instance, a first electrode arrangement input 74 will be different from a second electrode arrangement input 76. This allows the first electrode arrangement 60 and second electrode arrangement 62 to provide different inputs 64, 66 to the output arrangement 68. If, alternatively, the inputs 64, 66 were the same, the output arrangement 68, arranged to provide an output signal that is proportional to a difference between the first input 64 and second input 66, would be zero. In most embodiments, this would probably be of little or no use.

It will be understood that noise 72 is not a specific and dedicated input to the output arrangement. The Figure simply represents that the electrode arrangements 60, 62 receive or detect the same (common mode) noise.

FIG. 5 depicts a more detailed implementation of the schematic representation of a speed sensor arrangement shown in FIG. 4. Referring to FIG. 5, a first electrode arrangement 80 is shown. The first electrode arrangement 80 has a first configuration. A second electrode arrangement 82 is also shown. The second electrode arrangement 82 has a second, different configuration. The configurations of the first and second electrode arrangements 80, 82 are different in that the first electrode arrangement 80 has a different position relative to the second electrode arrangement 82, thus causing a difference in phase between a first input 84 provided by the first electrode arrangement 80 and a second input 86 provided by the second electrode arrangement 82. The first input 84 and second input 86 are received by a differential amplifier 88.

The first input 84 comprises a first periodically varying signal 90. The second input 86 comprises a second periodically varying signal 92. Due to the difference in configuration between the first electrode arrangement 80 and second electrode arrangement 82, the first periodically varying signal 90 is out of phase with the second periodically varying signal 92. The signals 90, 92 can be made to be out of phase, for example, by 180°, by appropriate location of the first and second electrode arrangements 80, 82. For instance, if the first and second electrode arrangements 80, 82 are used to measure the speed of rotation of a turbine wheel by passage of blades of that turbine wheel, the first and second electrode arrangements 80, 82 may be spaced apart by half the distance between blades of the turbine wheel to achieve the 180° difference in phase.

The differential amplifier 88 is arranged to provide an output 94 which is proportional to a difference between the first input 84 and second input 86. This differential approach eliminates any common noise in the first input 84 and second input 86. Furthermore, because the first input 84 and second input 86 are, in this embodiment, out of phase, the difference between the first input 84 and second input 86 may be maximised in a time-varying manner. This may result in the output 94 comprising a periodically time-varying output signal 96 which has a high signal-to-noise ratio, making it easier to determine the time-varying nature (e.g. the periodicity) of the signal 96, and thus the speed of rotation of a rotatable body, the rotation of which caused the periodic time variation.

In FIG. 5, a difference between a first input and a second input was described as being potentially maximised by ensuring that the first input and second input were out-of-phase with one another, for example, by 180°. Phase differences of greater or less than 180° may also be used to achieve a difference between the first and second inputs. Alternatively or additionally, another way of achieving a difference between the first and second inputs would be, for example, to ensure that the first input and second input had a different polarity. Perhaps to a lesser extent, a difference may also be achieved by, for example, ensuring that the first input and second input had different magnitudes. Such differences may be obtained, for example, by ensuring that the first electrode arrangement and second electrode arrangement comprise different materials, or have different shapes or sizes with respect to one another. For example, one or both of the first electrode arrangement and second electrode arrangement may be or may comprise one or more electrodes, or one or more electrodes in connection with one or more bodies of (different) material. For instance, the one or more bodies of material may have a tendency to gain electrons, or a tendency to lose electrons (i.e. to be at different ends of the triboelectric) series.

In order to obtain even better detection of a perturbation caused by rotation of, for example, a turbine wheel or the like, the first and second electrode arrangement may be held at a constant non-zero voltage by connection to a voltage source. Being at a constant voltage, the electrodes may establish or enhance a containment field in the vicinity of the respective electrode such that the effect of any perturbations are enhanced, for example, perturbations in an electric field, perturbations in capacitance, or perturbations in the accumulation or loss of charge in or on the electrode arrangements. The non-zero voltage may be, for example 60V, which is effective for containment. The higher the voltage, the greater the degree of containment. However, if the voltage is too high, circuit components can be damaged, and above 500V instability problems may arise. A voltage of around 200V may be a good compromise.

FIG. 6 schematically depicts a use of the speed sensor arrangement shown in and described with reference to FIG. 5. Referring to FIG. 6, a first electrode arrangement 80, second electrode arrangement 82 and differential amplifier 88 are shown. The first electrode arrangement 80 and second electrode arrangement 82 are shown as being located adjacent to a turbine wheel 5 provided with blades 40. Specifically, the first electrode arrangement 80 and second electrode arrangement 82 are retained on or in an internal wall 36 of a housing of the turbine wheel 5. The first electrode arrangement 80 and second electrode arrangement 82 are located such that, in use, rotation of the turbine wheel 5 causes blades 40 of the turbine wheel 5 to pass by the first electrode arrangement 80 and second electrode arrangement 82.

The first electrode arrangement 80 and second electrode arrangement 82 are shown as being located adjacent to one another, but in other embodiments the first electrode arrangement 80 and second electrode arrangement 82 may be located at any appropriate position (e.g. depending on phase requirements and the like) around the turbine wheel 5.

The first electrode arrangement 80 and second electrode arrangement 82 may be retained using any suitable arrangement. For example, the retaining member may be, for example, an adhesive or the like, or a body of material in which, or on which, the first electrode arrangement, second electrode arrangement, and/or output arrangement may be located. The one or more parts of the sensor arrangement may be electrically insulated from the body. The retaining member may be or comprise screws or rivets or other mechanical fixings. In another example, the retaining member may be, for example, a bore or channel or the like in a body that houses the rotatable body (e.g. a turbine housing or compressor housing). Preferably, however, the retaining member is moveable into and out of a position that is proximate to the turbine wheel 5 (or whichever rotatable body the speed sensor arrangement is used to measure the speed of rotation of). This may be advantageous, because it may be possible to form some or all parts of the sensor arrangement in the retaining member and then insert the retaining member into position relative to the turbine wheel 5 (or whichever rotatable body the speed sensor arrangement is used to measure the speed of rotation of). This may make installation and maintenance and the like easier. FIG. 7 shows an example of such a retaining member.

Referring to FIG. 7, the majority of the components shown in and described with reference to FIG. 6 are also shown, and are therefore given like reference numerals. However, in contrast to FIG. 6, in FIG. 7 the first and second electrode arrangements 80, 82 are retained by and at least partially within a retaining member 100 which extends around an axis of rotation of the turbine wheel 5 and abuts against an internal wall 36 of the housing of the turbine wheel 5.

FIG. 8 shows that the retaining member 100 may have a shape that is substantially that of a cylindrical shell. The retaining member 100 is thus suitable for use as, and may be, an insert for an outlet of a turbine housing or, for example, an inlet of a compressor. For instance, the retaining member 100 may additionally serve as a noise baffle for a turbine or compressor.

In another embodiment (not shown), a retaining member may only extend partially around the axis of rotation of the turbine wheel. In this embodiment, the retaining member has a shape that is substantially that of a portion of a cylindrical shell.

FIG. 9 shows that, in one embodiment, the retaining member 100 may retain in position the first electrode arrangement 80 and second electrode arrangement 82. The differential amplifier 88 (or any other suitable output arrangement) may optionally be located outside of (and not be retained by) the retaining member 100. FIG. 10 shows, that in another embodiment, the retaining member 100 may also retain in position the differential amplifier 88 (or other output arrangement).

In the embodiments described above, first and second electrode arrangements have been described. However, in other embodiments further electrode arrangements may be used. For example, FIG. 11 schematically depicts a retaining member 100 retaining in position three or more (and in this embodiment, five) electrode arrangements 102. Each of the electrode arrangements 102 may be configured to provide a respective input, which preferably comprises the same noise as any other input provided by another electrode arrangement 102. The inputs of each of the electrode arrangements 102 also have a different component, so that useful information (e.g. a non-zero and time varying signal or the like) can be obtained by taking a difference between any two or more of the inputs of the respective electrode arrangements 102.

Any two or more of the electrode arrangements 102 may be connectable to an output arrangement 104 in order to be able to select which input (i.e. which two or more inputs) are provided to the output arrangement 104. This may be achieved using a switching means or the like. The input from each electrode arrangement 102 may be first provided to a selection arrangement 106 which may be configured to select one or more desired input signals, or to select an input signal or input signals which results (or which would result) in a desired output signal. A desired input or output signal may be, for example, a strong signal, a signal comprising a lower amount of noise, or a signal having a good or best signal-to-noise ratio.

In one example, the selection arrangement 106 may be configured to selectively receive inputs from different electrode arrangements 102 (for example, different pairs of electrode arrangements 102) and determine which of these inputs does, or would, provide a desired output signal. This may be particularly advantageous if a sensor arrangement is to be used on a turbine wheel (or other rotatable body) for which a space in-between salient members of that turbine wheel (or other rotatable body) is not known. Because the spacing is not known, it may be difficult to ensure that the electrode arrangements 102 have a pre-determined spacing which coincides with, for example, half the distance between the salient members (or an integer amount of such distances plus half a distance) to achieve a desired phase difference between the inputs provided by the electrode arrangements 102. Thus, the provision of a number of electrode arrangements 102, and the ability to select which inputs are provided to an output arrangement 104 may obviate or mitigate the spacing problem. This is because, the location and/or spacing between of one more electrode arrangements may result in the input signals that they provide being out of phase (for example, by 180°).

The spacing between the electrode arrangements 102 may be non-uniform, which may increase the chances of one or more of the electrode arrangements being spaced apart from one another by a spacing which is equal to half the distance (or an integer amount of such distances plus half a distance) between the salient members of the rotatable body.

In another embodiment, pairs of electrode arrangements may be provided with respective output arrangements, such that a plurality of output signals may be provided (e.g. one from each output arrangement). A selection arrangement may be provided which is configured to receive the multiple output signals, and select which of the other signals is desired (e.g. strongest, least noisy, and the like). This desired output signal may then be used to determine the speed or rotation of the rotatable body.

A selection arrangement may be a computational device, or a tuned circuit, or any arrangement which can, for example, identify a strongest signal, a least noisy signal, or a signal with a low or lowest signal-to-noise ratio. The selection of one or more signals may be undertaken automatically by the selection arrangement.

In speed sensor arrangement embodiments where more than two electrode arrangements are used, the speed sensor may be used to measure the speed of rotation of any one of a number of, for example, turbine wheels (or a salient member of any rotatable body). This means that a single speed sensor can be manufactured that may be capable of working with different turbine wheels, for example. This makes the speed sensor arrangement more versatile, and thus more useful.

In another embodiment (not shown), a single (e.g. a first) electrode arrangement may comprise of a number of electrodes connected together in parallel. The dielectric strength in such an arrangement is additive, meaning that each parallel electrode adds to the magnitude of a measured signal (e.g. the signal strength is proportional to the number of electrodes). Signal to noise ratio is also improved in such an arrangement. A plurality of electrodes may be disposed around an object, the speed of rotation of which is to be measured, and all of those electrodes may be connected to one another to form a single electrode arrangement. The electrodes may be disposed with angular separations that coincide with angular separations of salient members of the object (e.g. fins or blades). A second, similar electrode arrangement may have different electrodes, also connected in parallel, and which are disposed with angular separations that coincide with angular separations of salient members of the object (e.g. fins or blades). The positions of the electrodes of the first arrangement may be offset from the positions of the electrodes of the second arrangement, so that different time varying signals are measurable, as discussed above.

In the embodiments described above, one or more of the first electrode, second electrode, and output arrangement have been described as being retained by a retaining member. The retention may not be a fixed or permanent retention, but can instead be a semi-fixed, temporary or selectable manner of retention. For example, at least one of the first electrode arrangement and second electrode arrangement may be removable, the retaining member being configured to accommodate movement of the first electrode arrangement and/or second electrode arrangement and to retain (e.g. selectively retain) the first electrode arrangement and/or second electrode arrangement after such movement. FIG. 12 schematically depicts an example of such a retaining member.

FIG. 12 schematically depicts a retaining member 110 in the form of a cylindrical shell. The retaining member 110 is provided with a plurality of retention points 112, which may be, for example, slots, grooves, latches or the like provided on or in the retaining member 110. Electrode arrangements 114 may be moveable between or along one or more different retention points 112 to be able to, for example, locate the electrode arrangements 104 in a desired location. The desired location may be a location in which different electrode arrangements 104 are separated from one another by a certain distance, for example, half the distance between adjacent salient members of a rotatable body or the like.

Using the speed sensor arrangement of any of the embodiments of the present invention, a speed of rotation of a salient member of a rotatable body may be measured. For example, a method of using the speed sensor arrangement may comprise providing a first input using a first electrode arrangement, and providing a second input using a second electrode arrangement. The second input is different from the first input, but the first electrode arrangement and second electrode arrangement are configured such that noise in the first input is substantially the same as noise in the second input. A variation in the first input and a variation in the second input will be caused by the rotation of the rotatable body and associated movement of the salient member past the first electrode arrangement and the second electrode arrangement. The method may further comprises providing an output using an output arrangement. The output arrangement is configured to receive the first input and the second input, and to provide the output, the output being proportional to a difference between the first input and the second input. One or more of the first electrode arrangement, second electrode arrangement and output arrangement are retained during the method. For example, the electrode arrangements may be retained in position to prevent any movement of the arrangements, which could affect the accuracy with which the speed of rotation can be measured. The method further comprises measuring the speed or rotation of the salient member using the variation in the output caused by rotation of that salient member. For example, a periodicity or time variation of the output may correspond to, be related to, or be equal to the speed of rotation of the salient member. For example, if the rotatable body has one salient member and the output has a single peak every second, the rotatable body will be rotating at one rotation per second.

As described above, the measurement of the speed of rotation of the rotatable body depends on the variation in input signals provided by electrode arrangements, the variation being caused by one or more perturbations detected (or picked up by) by those electrode arrangements. The perturbation does not depend, for example, on the material of the rotatable body. This means that the rotatable body may be, for example, an electrical insulator, and the speed of rotation may still be measurable using the speed sensor arrangement of embodiments of the present invention.

The first noise which is common to both the first input and second input may be common mode noise. The first electrode arrangement and second electrode arrangement may be similarly susceptible to or sensitive to at least one common mode noise source, and/or to common mode interference. Other (e.g. second or third noise in the form of, for example, radio waves or the like) may be present in the inputs. If the noise is common to both inputs, the output from the output arrangement will not contain this noise, since the output is proportional to a difference in the inputs. Only one of the inputs may be subjected to additional noise (e.g. noise other than the first noise), and this may thus form part of the output. However it is likely that since such noise will only affect one input, such noise will not be as significant as common mode (i.e. first noise), and that the output will be not be significantly affected.

Whilst the invention has been illustrated in its application to the turbine of a turbocharger, it will be appreciated that the invention can have other applications. In general, the speed sensor arrangement of the present invention may be suitable for use in measuring a speed of rotation of a salient member of a rotatable body. The rotatable body could be, for example, a turbine wheel or a compressor wheel. The salient member could be one or more blades of the turbine wheel or compressor wheel. The turbine wheel may form part of a turbine, for example a variable geometry turbine. The compressor wheel may form part of a compressor. The turbine and/or compressor may form part of a turbocharger or other turbomachinery. The turbocharger may form part of, or be in connection with, an internal combustion engine, for example an engine of an automobile.

The retaining member of any embodiment may be suitable for use as, and may be, an insert for an outlet of a turbine housing or, for example, an inlet of a compressor. For instance, the retaining member may additionally serve as a noise baffle for a turbine or a compressor.

In any one or more of the above embodiments, the electrode arrangement or arrangements may be formed using, or with, or in connection with, a laminar (i.e. layered) construction. Such construction may be preferred, since such a laminar construction may allow electrodes to be easily positioned relative to one another, e.g. inter-digitated, and/or insulated, and/or coated, or otherwise processed. Such a laminar construction may also facilitate the installation and/or removal of the electrode arrangement from the retaining member, or the laminar construction could be the retaining member. For example, a laminar construction may facilitate a single-piece construction for the electrode arrangements, for example in the form of a ribbon or tape like structure. The laminar structure may involve the printing onto a film or other substrate, such as an electrical conductor onto an electrical insulator, or an electrical insulator on to an electrical conductor. The film or substrate (i.e. a layer) may be or comprise a polyester or polycarbonate film or substrate, such as Mylar™ or Lexan™.

Other possible modifications to the detailed structure of the illustrated embodiment of the invention will be readily apparent to the appropriately skilled person. Various modifications may be made to the embodiments of the invention described above, without departing from the present invention as defined by the claims that follow.

The invention claimed is:

1. A speed sensor arrangement for use in measuring a speed of rotation of a salient member of a rotatable body, the speed sensor arrangement comprising:
   two or more electrodes arrangements the two or more electrode arrangements including a first electrode arrangement configured to provide a first input and a second electrode arrangement configured to provide a second input, the second input being different from the first input, and wherein the rotatable body is one of a compressor wheel of a compressor and a turbine wheel of a turbine and the two or more electrode arrangements are retained on or in an internal wall of a retaining member that is in the form of a cylindrical shell inserted into a compressor inlet of the compressor or a turbine outlet of the turbine and positioned at least partially around one of the compressor wheel and the turbine wheel, wherein the retaining member is not a housing of the compressor, a housing of the turbine, or a shroud of the turbine;

the first electrode arrangement and the second electrode arrangement being separated from each other on or in the retaining member, the separation between the first electrode arrangement and the second electrode arrangement being in a circumferential direction around the retaining member to provide a difference of phase between the first input and the second input, such that first noise in the first input is substantially the same as first noise in the second input, and wherein a variation in the first input and a variation in the second input is caused in response to rotation of the rotatable body and associated rotation of the salient member past the first electrode arrangement and the second electrode arrangement;

a differential amplifier that is retained by the retaining member, the differential amplifier having an inverting input which is connected to the first electrode arrangement and receives the first input and having a non-inverting input which is connected to the second electrode arrangement and receives the second input, the differential amplifier being configured to provide an output that is proportional to a difference between the first input and the second input, the output further being a representation of the speed of rotation of the salient member caused by the rotation of the salient member past the first and second electrode arrangements during the rotation of the rotatable body; and the speed sensor arrangement further comprising a voltage source configured to provide a constant voltage, and wherein the first electrode arrangement and the second electrode arrangement are connected to the voltage source such that the first electrode arrangement is provided with the constant voltage and the second electrode arrangement is provided with the constant voltage.

2. The speed sensor arrangement of claim 1, wherein at least one of the first electrode arrangement and the second electrode arrangement are moveable, the retaining member being configured to accommodate movement of the at least one of the first electrode arrangement and the second electrode arrangement and to retain the at least one of the first electrode arrangement and the second electrode arrangement after such movement.

3. The speed sensor arrangement of claim 1, wherein the salient member is a blade of the compressor wheel.

4. The speed sensor arrangement of claim 1, wherein the retaining member is a noise baffle.

5. The speed sensor arrangement of claim 3, wherein the first and second electrode arrangements are spaced apart by half of a distance between the blade and an adjacent blade of the rotatable body.

6. The speed sensor arrangement of claim 5, wherein the phase diffrence is a 180° difference in phase between the first input and the second input that is caused by the circumferential separation between the first and second electrode arrangements.

7. A method of measuring a speed of rotation of a salient member of a rotatable body using a speed sensor, the method comprising:

providing two or more electrodes arrangements including a first electrode arrangement and a second electrode arrangement, wherein the rotatable body if one of a compressor wheel of a compressor and a turbine wheel of a turbine and the two of more electrode arrangements are retained on or in an internal wall of a retaining member that is in the form of a cylindrical shell positioned at least partially around the one of the compressor wheel and the turbine wheel, the cylindrical shell being inserted into an inlet of the compressor or into an outlet of the turbine, wherein the first electrode arrangement and the second electrode arrangement are separated from each other on or in the retaining member, the separation between the first electrode arrangement and the second electrode arrangement being in a circumferential direction around the retaining member to provide a difference of phase between a first input of the first electrode arrangement and a second input of the second electrode arrangements, wherein the retaining member is not a housing of the compressor, a housing of the turbine, or a shroud of the turbine;

supplying the constant voltage to the first electrode arrangement and supplying a constant voltage to the second electrode arrangement;

rotating the rotatable body receiving,with a differential amplifier, the first input from the first electrode arrangement and the second input from the second electrode arrangement, the first electrode arrangement and the second electrode arrangement being configured such that first noise in the first input is substantially the same as first noise in the second input, a variation in the first input and a variation in the second input being caused by the rotation of the rotatable body and associated rotation of the salient member past the first electrode arrangement and the second electrode arrangement, providing an output using the differential amplifier, the differential amplifier being retained by the retaining member and receiving the first input at an inverting input of the differential amplifier and receiving the second input at a non-inverting input of the amplifier.

8. The method of claim 7, wherein the phase difference is a 180° difference in phase between the first input and the second input that is caused by the circumferential separation between the first and second electrode arrangements.

* * * * *